(12) United States Patent
Podpaly et al.

(10) Patent No.: US 10,474,129 B2
(45) Date of Patent: *Nov. 12, 2019

(54) REPLACING A CONTROLLER ON A PROCESS DEVICE

(71) Applicant: Dresser, LLC, Houston, TX (US)

(72) Inventors: Anatoly Podpaly, Sharon, MA (US); Xianren Kong, Lexington, MA (US); Yanli Liu, Shanghai (CN); Justin Scott Shriver, Newton, MA (US); Ryan Zhu, Shanghai (CN)

(73) Assignee: Dresser, LLC, Houston, TX (US)

(*) Notice: Subject to any disclaimer, the term of this patent is extended or adjusted under 35 U.S.C. 154(b) by 0 days.

This patent is subject to a terminal disclaimer.

(21) Appl. No.: 16/116,428

(22) Filed: Aug. 29, 2018

(65) Prior Publication Data

US 2019/0033822 A1 Jan. 31, 2019

Related U.S. Application Data

(62) Division of application No. 15/085,501, filed on Mar. 30, 2016, now Pat. No. 10,146,206.

(51) Int. Cl.
*G05B 19/406* (2006.01)
*G05B 19/416* (2006.01)
*G05B 19/418* (2006.01)

(52) U.S. Cl.
CPC ......... *G05B 19/406* (2013.01); *G05B 19/416* (2013.01); *G05B 19/4184* (2013.01); *G05B 2219/32226* (2013.01); *G05B 2219/41306* (2013.01); *G05B 2219/45006* (2013.01); *Y02P 90/14* (2015.11)

(58) Field of Classification Search
None
See application file for complete search history.

(56) References Cited

U.S. PATENT DOCUMENTS

| 6,112,638 | A | 9/2000 | Loechner |
|---|---|---|---|
| 7,984,199 | B2 | 7/2011 | Ferguson et al. |
| 8,342,478 | B1 | 1/2013 | Cordray et al. |
| 8,832,236 | B2 | 9/2014 | Hernandez et al. |

(Continued)

FOREIGN PATENT DOCUMENTS

| CN | 101126928 A | 2/2008 |
|---|---|---|
| CN | 101939714 A | 1/2011 |

(Continued)

OTHER PUBLICATIONS

International Search Report and Written Opinion of International Search Authority for corresponding PCT/CN2016077797 dated Jan. 5, 2017.

*Primary Examiner* — Bernard G Lindsay
(74) *Attorney, Agent, or Firm* — Paul Frank + Collins P.C.

(57) ABSTRACT

A method for replacing a controller on a process device that avoids downtime on a process line. The method may include retrieving data from a first controller on a valve assembly, the data comprising information that defines values for operating parameters on the first controller, removing the first controller from the valve assembly, coupling a second controller to the valve assembly, and storing data on the second controller, the data comprising information that defines the values for operating parameters corresponding with the first controller.

15 Claims, 11 Drawing Sheets

(56) References Cited

U.S. PATENT DOCUMENTS

| | | | |
|---|---|---|---|
| 10,146,206 B2 * | 12/2018 | Podpaly | ............... G05B 19/406 |
| 2009/0014672 A1 | 1/2009 | Schiemann | |
| 2009/0228611 A1 | 9/2009 | Ferguson | |
| 2011/0073197 A1 | 3/2011 | Hirose | |
| 2015/0052512 A1 | 2/2015 | Kostadinov et al. | |
| 2016/0291563 A1 * | 10/2016 | Kumar | ................ H04L 41/0883 |

FOREIGN PATENT DOCUMENTS

| | | |
|---|---|---|
| DE | 102009028655 A1 | 2/2011 |
| JP | 2004144259 A | 5/2004 |
| WO | 2011076479 A1 | 6/2011 |
| WO | 2014209695 A1 | 12/2014 |
| WO | 2015075615 A1 | 5/2015 |

* cited by examiner

REPLACING A CONTROLLER ON A PROCESS DEVICE

CROSS-REFERENCE TO RELATED APPLICATIONS

This application is a divisional of U.S. Ser. No. 15/085,501, filed on Mar. 30, 2016, and entitled "REPLACING A CONTROLLER ON A PROCESS DEVICE," the content of which is incorporated by reference herein in its entirety.

BACKGROUND

Industrial automation can use process devices to automate processes on a process line. Engineers expend great efforts to decrease downtime of the process lines, often as a result of equipment maintenance and replacement of these process devices. These efforts are meant to save time and money, as relates to both labor and on reduced productivity that may result when the process line becomes inactive or inoperable due to maintenance necessary to remove and replace process devices from the process line.

SUMMARY

The subject matter of this disclosure relates to industrial automation and processes, where applicable. Of particular interest herein are improvements that can allow process devices to continue to operate contemporaneously with maintenance to change hardware (including, e.g., electronics) on the device. These improvements also allow the process device to integrate new hardware without the need to recalibrate or otherwise engage in lengthy commissioning procedures for use on the process line. Exemplary process devices may find use on process lines that transfer and distribute materials including solids and fluids (e.g., gases and liquid). Valve assemblies are one type of process device, for example, that can regulate flow of materials in process lines for the chemical industry, refining industry, oil & gas recovery industry, and the like.

Some embodiments include a controller that operates the process device. On valve assemblies, the controller may embody a valve positioner that is responsible for control and operation of a valve that regulates the flow of material through the device. Examples of the controller can communicate with a terminal, often a laptop or like computing device, as part of a system to implement the improvements discussed herein. This system can transfer data from a previously-installed controller to a newly-installed controller found on the process device. In this way, the process device can maintain operation of the process device in the same manner as the previously-installed controller.

Other hardware on some embodiments can vary as necessary to accommodate its operation on the process line. For valve assemblies, the hardware may include an actuator that couples with a closure member (via a stem). The closure member may embody a plug, a ball, a butterfly valve, and/or like implement that can contact a seat to prevent flow. Actuators that rely on pneumatics may be useful to facilitate movement of the closure member. The embodiments may also have a sensing mechanism to monitor the position of the closure member. This sensing mechanism may use a position sensor and a mechanical linkage that couples the position sensor with the stem or other structure that moves in concert with the closure member.

The controller may serve to exchange signals with a process control system (also "distributed control system" or "DCS system"). This configuration can instruct operation of process devices on the process line. The control signals may define operating parameters for the process device that correspond to processes on the process line. On valve assemblies, the valve positioner may use the operating parameters in combination with, for example, input from the position sensor, to regulate instrument gas to the actuator in order to set the position required for the closure member. This position may achieve appropriate flow of material through the valve assembly into the process line to satisfy the process.

Use of the embodiments and related improvements benefits industrial automation and processes in a number of ways. At a high level, the system can preclude the need for topologies of process lines that may require considerable costs as to downtime and capital expenditures. By allowing the process device to continue to operate during maintenance, for example, the embodiments herein effectively eliminate topologies that simply require process lines to shut down completely to perform maintenance on certain process devices. The embodiments further preclude the need for redundant networks that switch flow of material from a first conduit to a second conduit to allow maintenance to occur on certain process devices of the first conduit. Moreover, the embodiments can also avoid unnecessary and lengthy calibration steps that may be necessary to ensure accurate operation of the valve as between the prior-installed and newly-installed controller. Failure to account for these changes could cause the process device with the newly-installed controller to behave unpredictably and, in turn, lead to undesired changes in the process on the process line.

BRIEF DESCRIPTION OF THE DRAWINGS

Reference is now made briefly to the accompanying drawings, in which.

Figure 1:
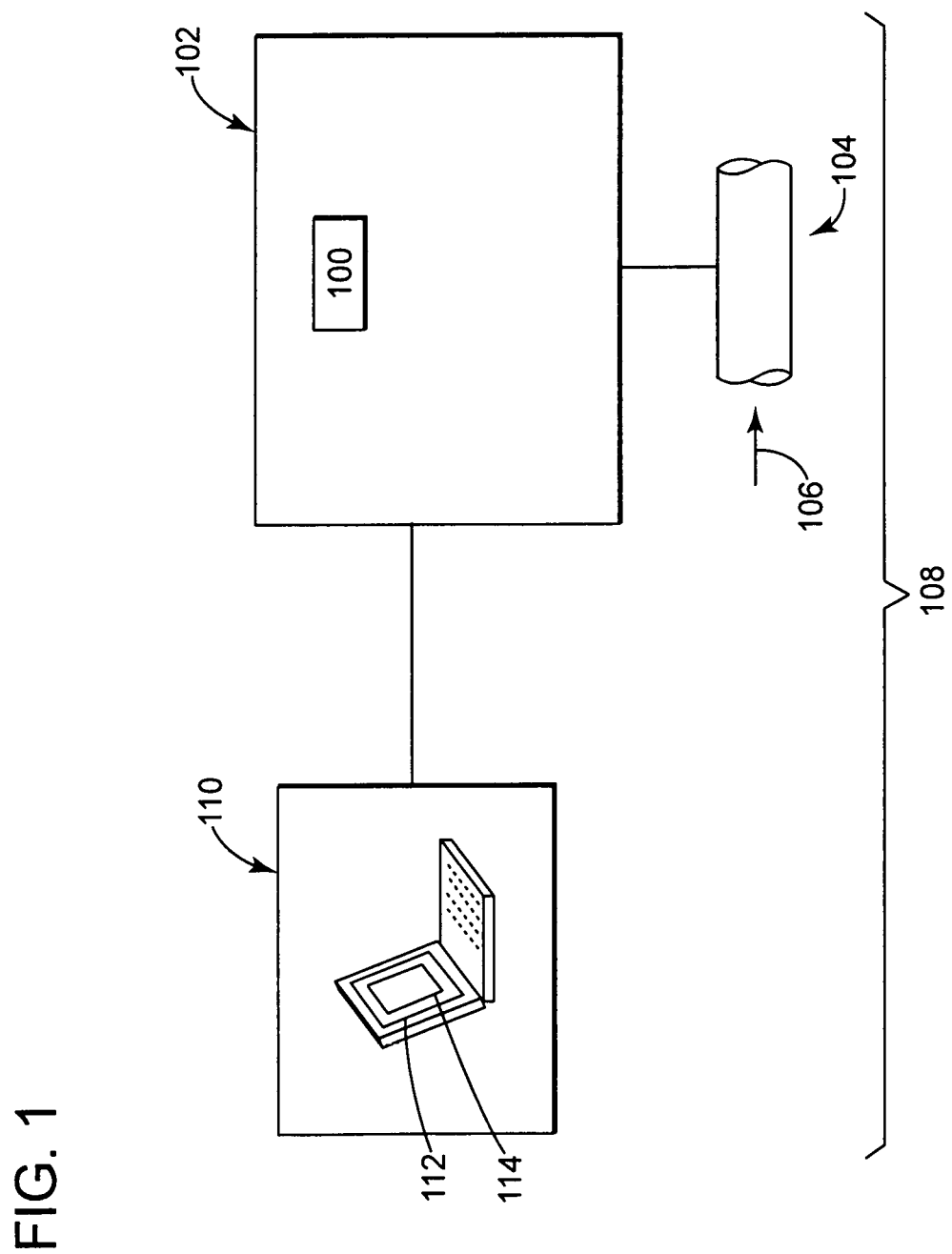
FIG. 1 depicts a schematic diagram of an exemplary embodiment of a controller that is configured with the improvements herein.

Where applicable, like reference characters designate identical or corresponding components and units throughout the several views, which are not to scale unless otherwise indicated. The embodiments disclosed herein may include elements that appear in one or more of the several views or in combinations of the several views. Moreover, methods are exemplary only and may be modified by, for example, reordering, adding, removing, and/or altering the individual stages.

DETAILED DESCRIPTION

The discussion below describes embodiments that can mitigate or reduce downtime on a process line. These embodiments allow an end user to replace control hardware (e.g., a controller) on a process device as between a first controller to a second controller. However, as noted below, use of the second process device is not confounded by additional steps to calibrate (or perform other tasks) that might be necessary to ensure that the performance of the process device with the second controller is the same or similar to performance of the process device with the first controller.

FIG. 1 illustrates a schematic diagram of an exemplary embodiment of a controller 100. This embodiment is part of a process device, identified generally and enumerated by the numeral 102. The process device 102 can couple with an asset, for example, a conduit 104 that can carry material 106. Examples of the process device 102 can embody a valve assembly and like devices that can control flow of material 106, although this disclosure does not find limits in only these types of devices. The conduit 104 may be part of a process line that can use the material 106 in a process. In one implementation, the process device 102 is shown as part of a system 108 that may include a terminal 110, possibly a computing device with a display 112 that can display a visual interface 114. This computing device may embody a laptop (an example being illustrated in the diagram), tablet, or smart phone; but the computing device may be any device that an end user (e.g., a technician) can utilize to enter, receive, or visualize data on the display 112.

At a high level, the system 108 can allow maintenance on the process device 102 to occur without undue disruption to the process or operation of the process line. Maintenance may include tasks to swap the controller 100 on the process device 102 from, for example, a first controller to a second controller that is different from the first controller. These tasks may be necessary to upgrade electronics, replace faulty parts, or to address other concerns that might arise from time-to-time with devices for use in industrial automation.

Use of the system 108 may allow the process device 102 to remain in position and operational on the conduit 104 (or, generally, on the process line) without the controller 100. This feature may avoid costly downtime of the process line that might occur if the end user needs to remove the process device 102 in its entirety from the process line to change the controller 100. The system 108 can also ensure consistent operation of the process device 102 as between the first controller and the second controller without the need to perform additional, and timely, calibration or like tasks to commission the process device 102 for use on the process line with the second controller. In this way, the system 108 can further reduce services costs because the end user that performs the task does not need any particular training or technical background that might be necessary to de-commission and commission the replacement process device 102.

Figure 2:
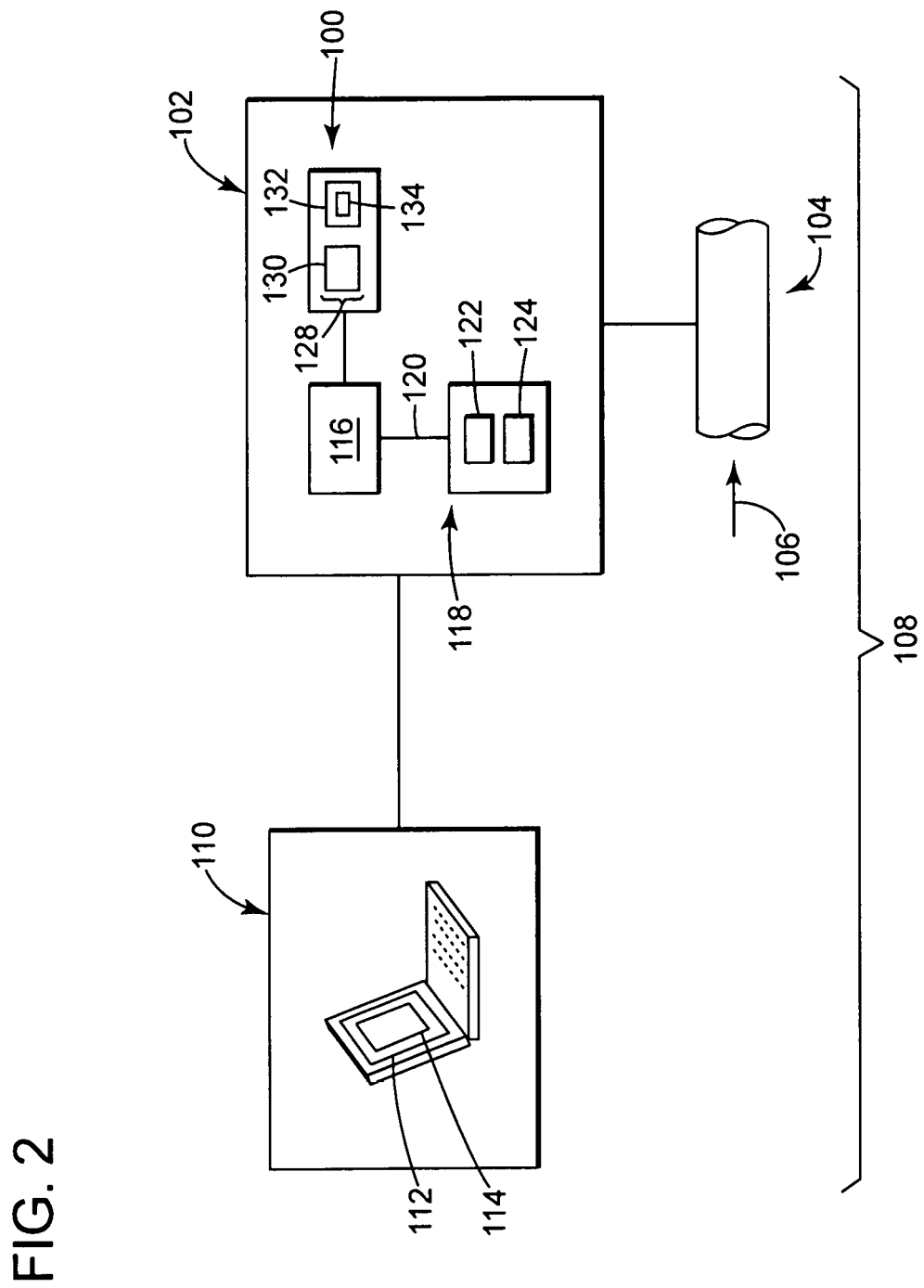
FIG. 2 depicts a schematic diagram of an exemplary embodiment of a controller that is configured with the improvements herein.

FIG. 2 depicts a schematic diagram with an exemplary collection of components that may be useful to implement the features that facilitate maintenance of the process device 102. For valve assemblies, the process device 102 may include an actuator 116 that couples with a valve 118 using a coupler 120 interposed therebetween. The coupler 120 may embody a "valve stem" in the form of an elongated, rod-like element that is configured to cause the actuator 116 to move a closure member 122 relative to a seat 124. The closure member 122 can comprise a plug, typically a solid or piece part element that can engage with the seat 124 to prevent flow of material 106 through the valve 118. In one implementation, the controller 100 may embody a positioner 126 (also, "valve positioner") that resides on-board the process device 100. The positioner 126 may have a board-level assembly 128 with computing components (e.g., a processor 130 and a repository 132). Executable instructions 134 may reside on one or both of the computing components 130, 132.

The components of the process device 102 are useful to regulate flow of material 106 in accordance with the process on the process line. In use, for example, executable instructions 134 may be accessible to configure the processor 130 to instruct performance of functions to occur on the controller 100 or the process device 102 in general. These functions may regulate a pneumatic signal to the actuator 116. This pneumatic signal can cause the actuator 116 to locate the closure member 122 at a requisite position relative to the seat 112. Often, this requisite position corresponds with flow parameters (e.g., flow rate) for material 106 to maintain the process on the process line. The embodiments can maintain performance of the process device 102 so that the requisite position of the closure member 122 is the same as between a first positioner 126 and a second positioner 126.

The discussion now turns to review embodiments, namely methods, to implement the maintenance procedures to replace the controller 100 on the process device 102. Reference to FIGS. 1 and 2 will continue for purposes of identifying certain components relevant to one or more stages of the methods. Generally, the exemplary methods may be useful to describe the maintenance procedure to change or "swap" the controller 100 on the process device 102 to facilitate operation on the process line. The exemplary methods may also be useful to configure one or both of the controller 100 and the terminal 110 for use in this maintenance procedure. In use, these devices can exchange data that can help to ensure that the requisite position of the closure member 122 is the same as between the first positioner and the second positioner, typically installed as a replacement for the first positioner on the process device 102.

Figure 3:
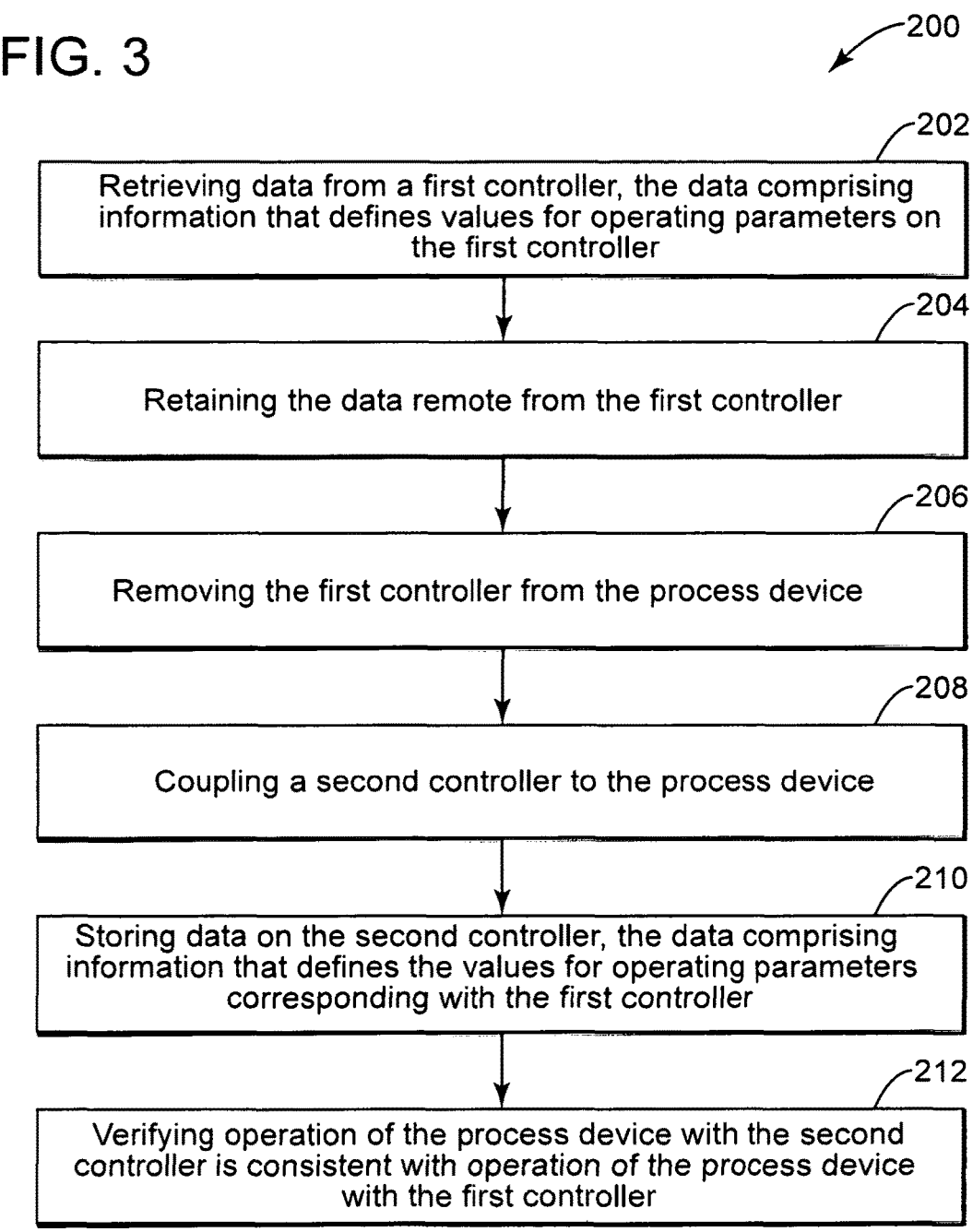
FIG. 3 depicts a flow diagram of an exemplary embodiment of a method for updating hardware on a process device.

FIG. 3 illustrates an exemplary embodiment of a method 200 for performing maintenance on a process device. The method 200 may include, at stage 202, retrieving data from a first controller, the data comprising information that defines values for operating parameters on the first controller and, at stage 204, retaining the data remote from the first controller. The data may identify values necessary to ensure performance of the device to maintain the requisite position of the closure member 122, noted above. The method 200 may also include, at stage 206, removing the first controller from the process device. This stage may include one or more stages for decoupling certain fluid lines, for example, lines that carry instrument air to the valve positioner 126 or lines that couple the valve positioner 126 to the actuator 116. These stages may also include removing fasteners, covers, and like components from the process device, as necessary. The method 200 may further include, at stage 208, coupling a second controller to the process device. Again, this stage could include one or more additional stages for reconnecting fluid lines and installing fasteners to ensure that the second controller is properly positioned and secured to the process device.

The method 200 continues with stages that can update the new hardware to maintain consistent operation of the process device with the second controller. In one implementation, the method 200 may include, at stage 210, storing data on the second controller, the data comprising information that defines the values for operating parameters corresponding with the first controller. This "cloning" stage is useful to maintain the operation of the process device as between the first controller and the second controller. At stage 212, the method 200 may include a stage for verifying that operation of the process device with the second controller is consistent with operation of the process device with the first controller. This stage may require the end user to evaluate certain operating parameters or performance variables for the process devices. Examples of the operating parameters can include the actual position for the closure member 122 (often as measured by a position sensor), the proscribed position for the closure member 122 (often as dictated by the DCM as a percentage (%) open for the valve 118, or proportional-integral-derivative (PID) parameters that operate as a feedback mechanism to accurately position the closure member 122.

Figure 4:
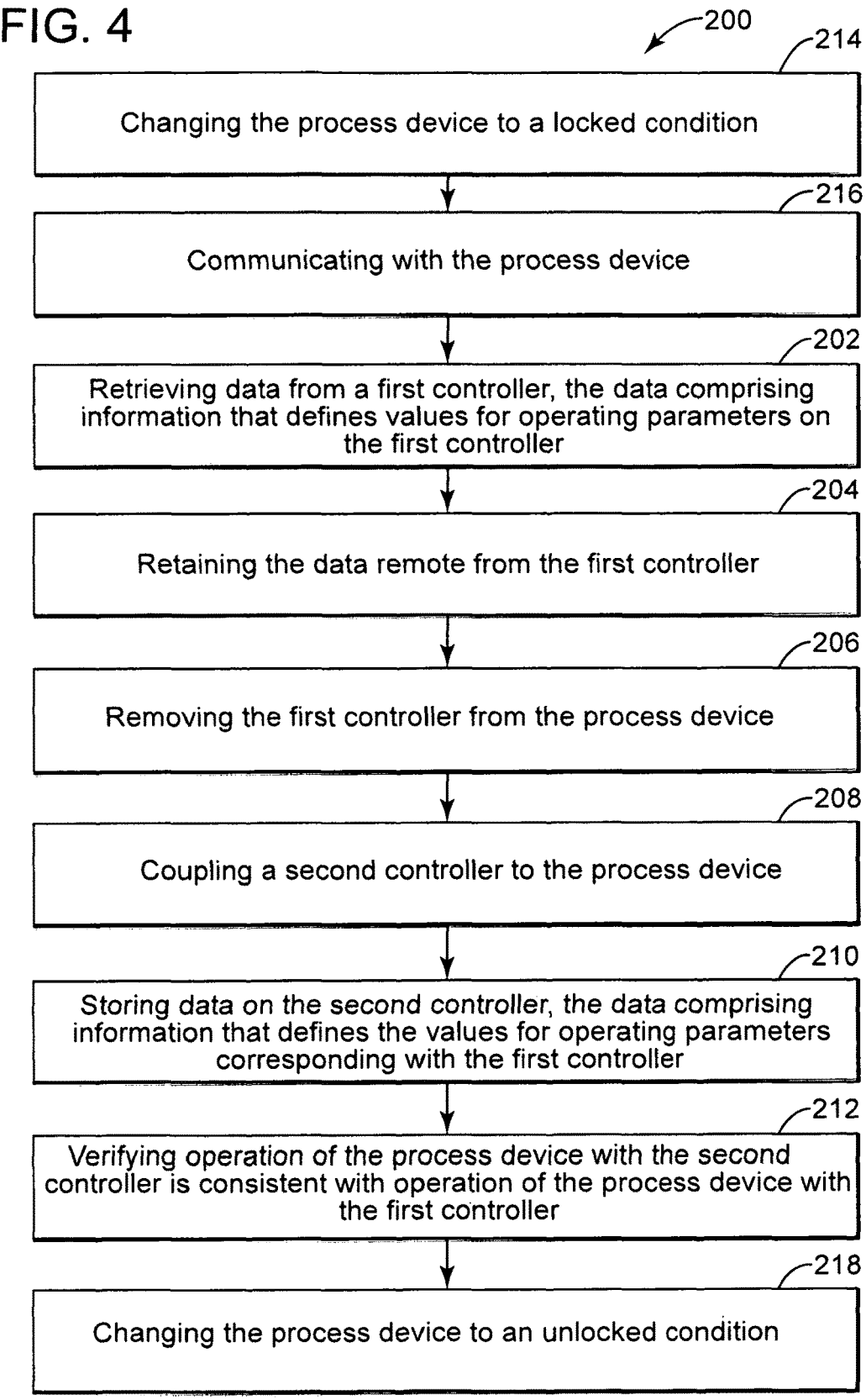
FIG. 4 depicts a flow diagram of the method of FIG. 3 with additional stages that may be useful for updating hardware on a process device.

FIG. 4 illustrates additional stages for the method 200 that may be useful to perform maintenance on the process device. One or more of these stages may find particular use with maintenance on valve assemblies (and like flow controls). As shown in FIG. 4, the method 200 may include, at stage 214, changing the process device to a locked configuration and, at stage 216, communicating with the process device, e.g., via the terminal. The method 200 may further include, at stage 218, changing the process device to an unlocked configuration.

FIGS. 5, 6, 7, 8, and 9 illustrate flow diagrams of exemplary embodiments of methods that configure the components of the system 108 (e.g., the controller 100 and terminal 110) to exchange data for purposes of removing hardware from the process device 102. These diagrams outline stages that may be embodied by code, software, firmware, or like compilations of executable instructions for one or more computer-implemented methods and/or programs. The executable instructions 134 may be stored locally so as to be accessible to the processor 130 for use at the positioner 126. The device may also be configured for the processor 130 to access the executable instruction in a remote location, e.g., storage in the "cloud." In use, the processor 130 may be configured to execute the executable instructions in a way that can utilize the data found on the smart circuit board 118. The stages in these methods can be altered, combined, omitted, and/or rearranged in some embodiments.

Figure 5:
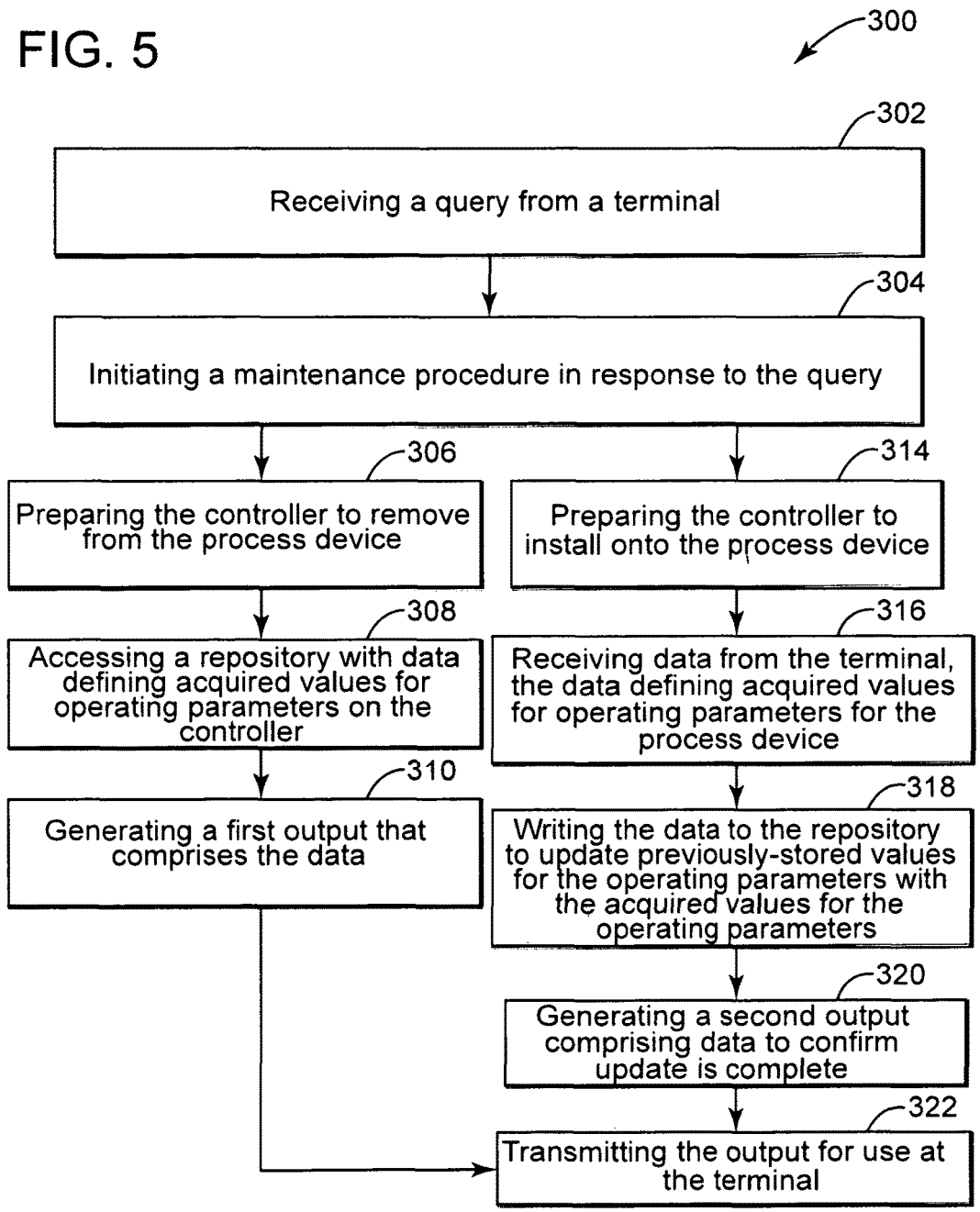
FIG. 5 depicts a flow diagram of an exemplary embodiment of a method, implementation of which can configure a controller on a process device to exchange and update data.

FIG. 5 illustrates a flow diagram of an exemplary embodiment of a method 300 that configures the controller 100 to exchange data. At a high level, the method 300 can include stages that allow the controller 100 to operate both as the existing controller that is to remove from the process device and as the new controller that is to install onto the process device in place of the existing controller. Such functionality may or may not be available on a single device, but this disclosure nonetheless contemplates opportunities for economies of scale and manufacture in which the functionality to operating in both modes is important.

The method 300 may include, at stage 302, receiving a query from a terminal and, at stage 304, initiating a maintenance procedure in response to the query. Examples of the query may include data that causes or instructs a response at the controller. This response may correspond with the data encoded in the query or due to processing of the query that occurs at the controller. In one implementation, the method 300 may include, at stage 306, preparing the controller to remove from the process device. The method 300 may also include, at stage 308, accessing a repository with data defining acquired values for operating parameters on the controller and, at stage 310, generating a first output that comprises the data. The repository may be found on-board the process device. The method 300 may further include, at stage 312, transmitting the output for use at the terminal. These stages may be helpful to transmit previously-stored operating parameters to the terminal so as to allow the end user to replace the controller in favor of another controller. As also shown in FIG. 5, the method 300 may include, at stage 314, preparing the controller to install onto the process device. The method 300 may include, at stage 316, receiving data from the terminal, the data defining acquired values for operating parameters for the process device and, at stage 318, writing the data to the repository to update previously-stored values for the operating parameters with the acquired values for the operating parameters. The method 300 may further include, at stage 320, generating a second output comprising data to confirm the update is complete and, where necessary, transmitting the output for use at the terminal (at stage 312).

Figure 6:
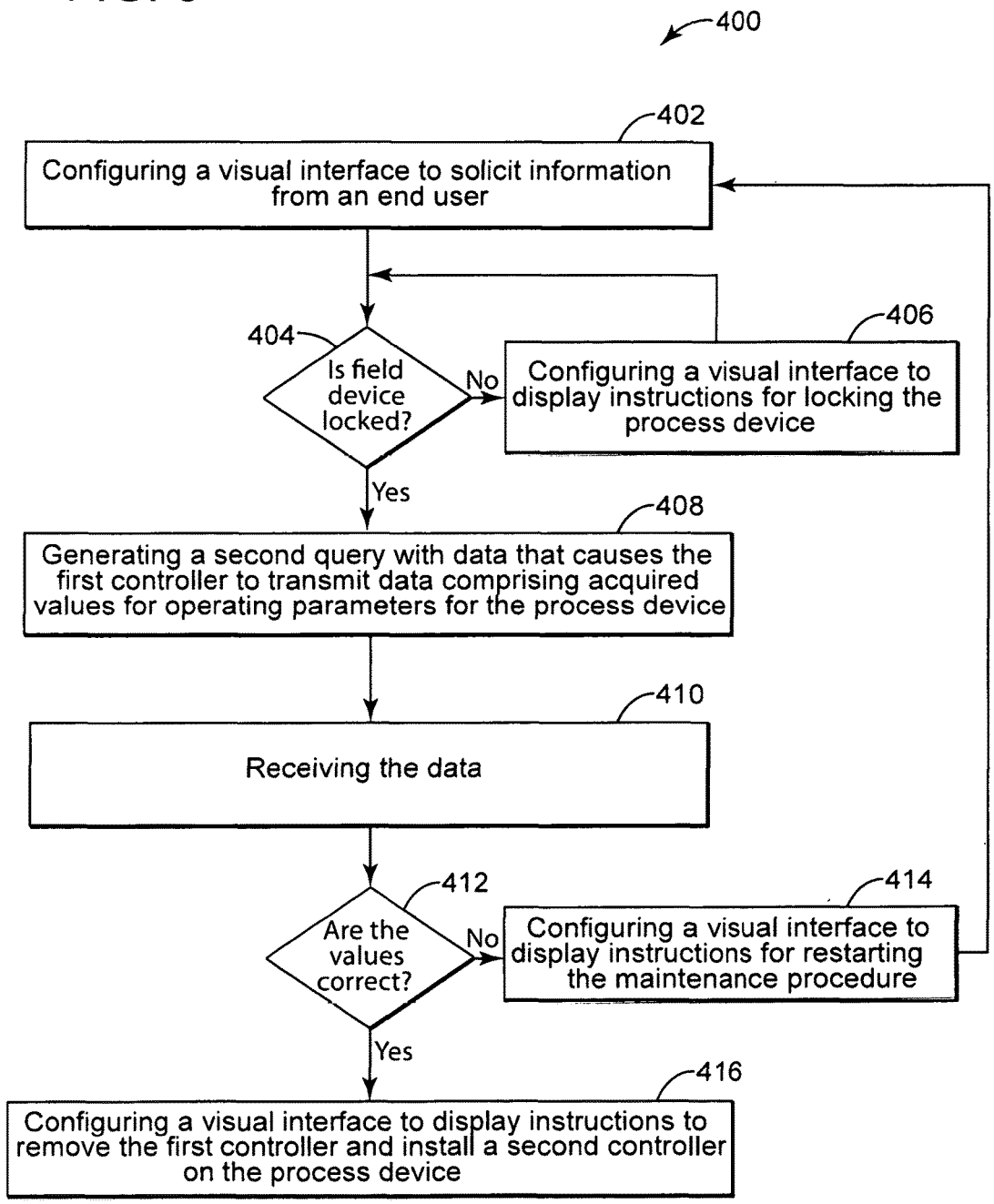
FIG. 6 depicts a flow diagram of an exemplary embodiment of a method, implementation of which can configure a terminal to exchange and update data with a controller and to configure a visual interface on a display.

FIG. 6 illustrates a flow diagram of an exemplary embodiment of a method 400 that configures a computing device (e.g., terminal 110) to exchange data with the controller 100. In this regard, the method 400 may include stages that configure the visual interface 114 to guide the end user through the process of removing a first controller from the process device and installing a second controller onto the process device. These stages can also configure the terminal 110 to generate and process data in a way that promotes effective maintenance on the process device 102.

The method 400 can include, at stage 402, configuring a visual interface to solicit information from the end user and, at stage 404, determining from this information whether the process device is in a locked (or non-moving) condition. In one example, the method 400 may include identifying a change in the valve assembly to the locked position that prevents movement of a closure member 122 relative to a seat 124 on the valve assembly 102. If not, then the method 400 may include, at stage 406, configuring a visual interface to display instructions for changing the process device to the locked condition, often from an unlocked (or moving) condition that is consistent with operation of the valve assembly 102 on the process line.

The method 400 may continue when the process device is locked. As shown in FIG. 6, the method 400 may include, at stage 408, generating a first query with data that causes a first (or "existing") controller to transmit data defining acquired values for operating parameters for the process device, at stage 410, receiving the data and, namely, receiving a first set of data from a first controller on a valve assembly, the data comprising information that defines values for operating parameters on the first controller. This stage may include writing a first set of data to a repository that is remove from or off-board of the first controller. The method 400 may also include, at stage 412, determining from the data whether the acquired values for the operating parameters are correct. This stage may be useful to ensure that the valve assembly 102 is, in fact, operating in an appropriate manner. In one example, the acquired values may define one or more stop limits (e.g., an upper stop limit and a lower stop limit) for the closure member 122. These stop limits are useful to prevent overdriving of the closure member 122 in directions that are toward and away from the seat 124. To confirm operation and movement of the closure member 122, the acquired values may also define the current position of the closure member or the set position, often defined as a percentage (%) open for the valve 118. In one implementation, the method 400 may includes one or more stages for displaying one or more of these acquired values on the visual interface 114 and, possibly, for configuring the visual interface for an input from the end user that confirms (or denies) that the acquired values are correct. If the acquired values are not correct, then the method 400 may include, at stage 414, configuring the visual interface to display instructions for restarting the maintenance task. This stage may be necessary to correct other problems at the valve assembly 102 before such problems manifest into more severe failure modes that can frustrate operation of the valve 118 and its components (e.g., the closure member 122 and the seat 124). On the other hand, if the acquired values are correct, then the method 400 may include, at stage 416, configuring the visual interface to display instructions to remove the first controller from the field and to install a second (or "new") controller on the process device. This stage may include stages for instructing an end user to remove the first controller from the valve assembly and for instructing the end user to install the second controller on the valve assembly. These instructions may detail processes for changing from the first controller to the second controller so that the end user can appropriately perform this part of the maintenance task.

Figure 7:
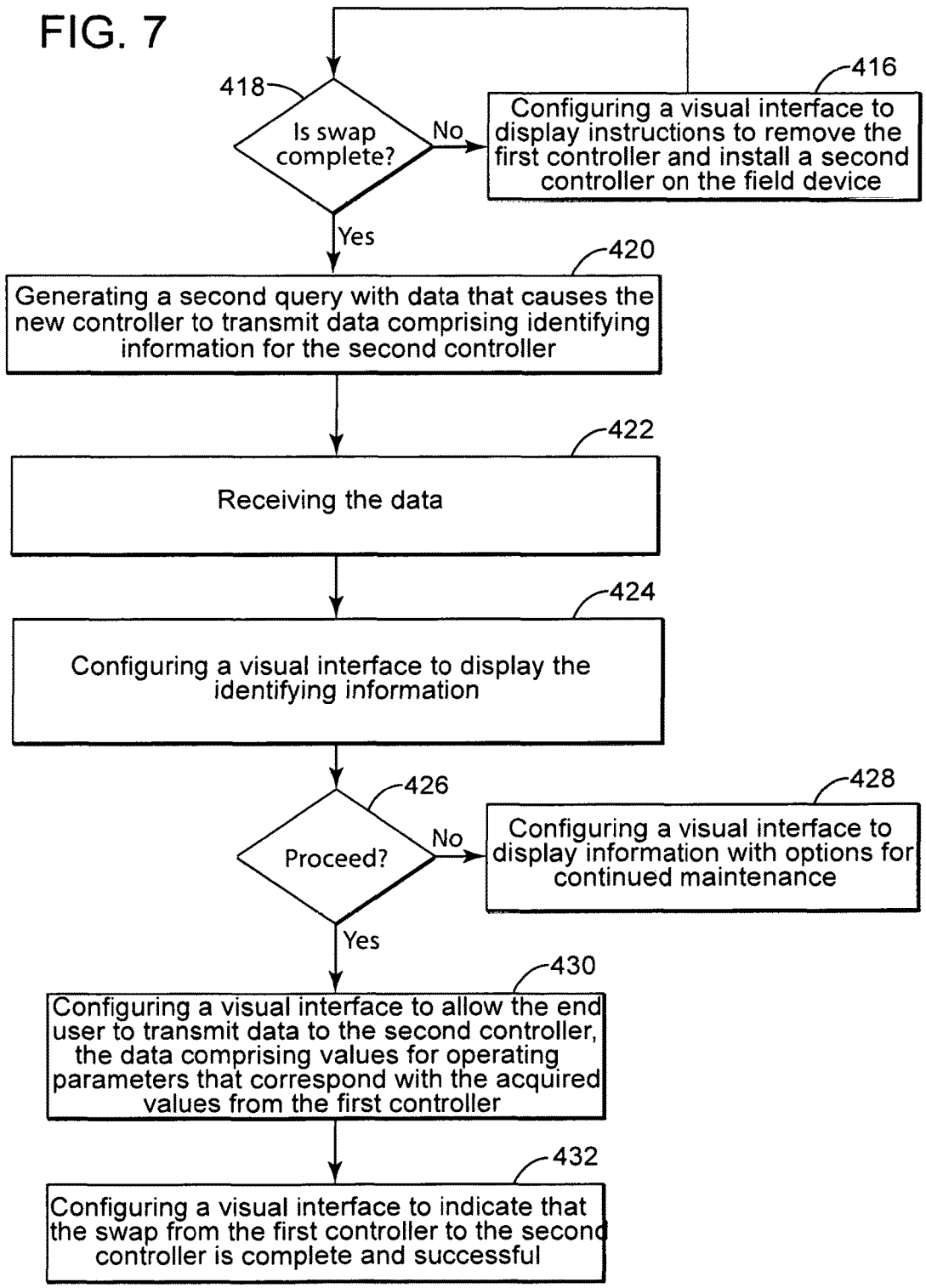
FIG. 7 depicts a flow diagram of the method of FIG. 6 with additional stages that may be useful to configure the terminal to exchange and update data with a controller and to configure a visual interface on a display.

Turning next to FIG. 7, the method 400 may include stages to update the second controller for use with the process device. The method 400 may include, at stage 418, determining whether the controller swap is complete, often by identifying a change from the first controller with a second controller on the valve assembly. This stage may including configuring a visual interface so that the end user can indicate (e.g., via a clickable toggle) that the second controller is properly connected and ready to operate on the process device. If complete, the method 400 may include, at stage 420, generating a second query with data that causes the new controller to transmit data comprising identifying information from the second controller. This identifying information may include serial numbers, software/firmware version, and like operative and non-operative data. The method 400 may include, at stage 422, receiving the data, and, at stage 424, displaying the identifying information, possibly contemporaneously identifying information from the first controller so that the end user can positively distinguish between the two controllers. This stage may allow the end user to visually confirm and verify that the second controller is proper for use with the process device. In this regard, the method 400 may include, at stage 426, determining whether to continue with the maintenance task. In one example, this stage may include one or more stages for configuring the interface to solicit an input from the end user to proceed with the maintenance task. If the input is negative, then the method 400 can continue, at stage 428, configuring the visual interface to display information with options for continued maintenance on the process device. However, if affirmative, then the method 400 may include, at stage 430, configuring the terminal to transmit data to the second controller, the data comprising values for operating parameters that correspond with the values on the first controller. For example, the method 400 may include generating a second set of data for use with the second controller on the valve assembly, the data comprising information that defines the values for operating parameters corresponding with the first controller. The method 400 may further include, at stage 432, configuring the visual interface to indicate that the swap from the first controller to the second controller is complete and successful.

Figure 8:
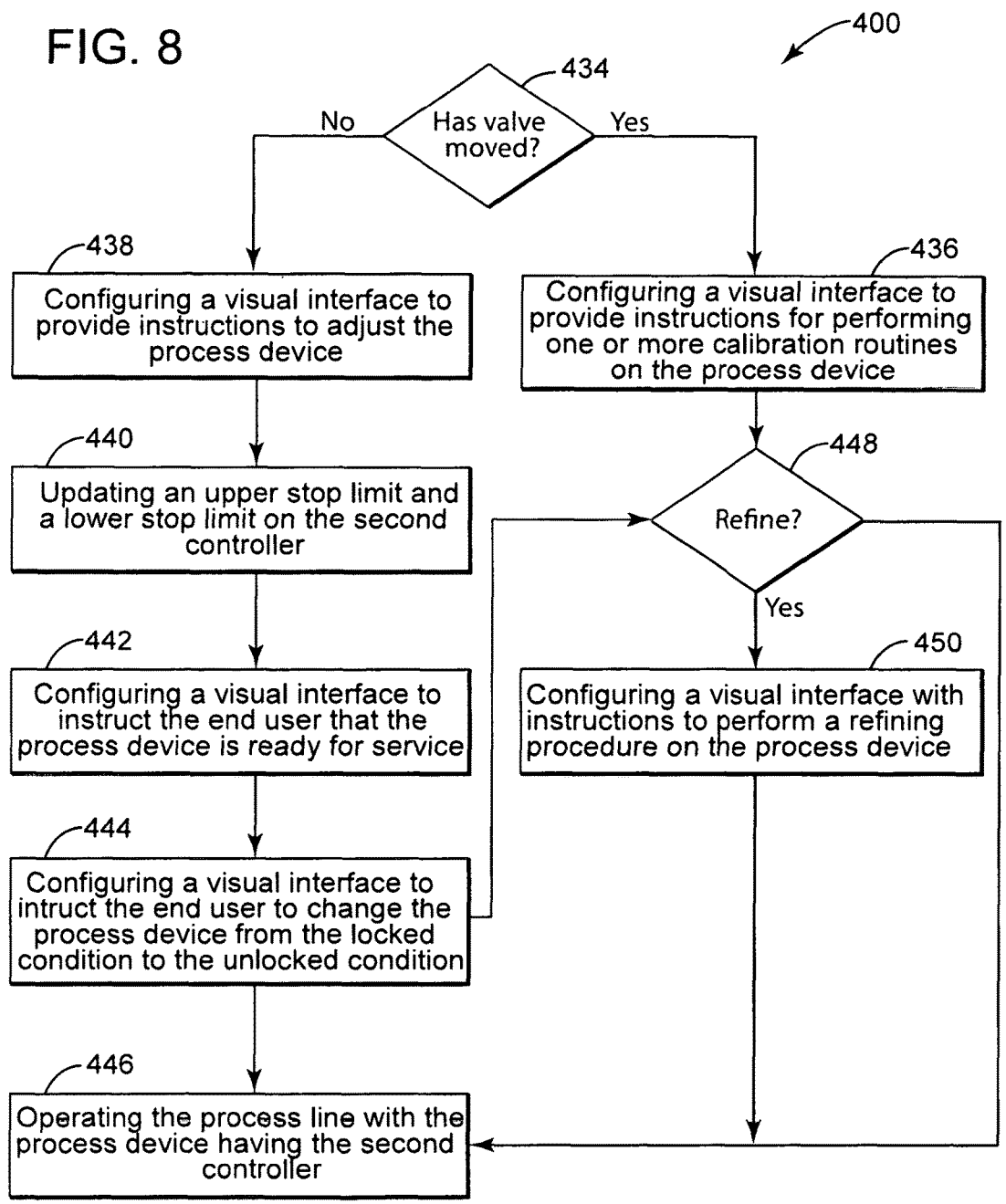
FIG. 8 depicts a flow diagram of the method of FIG. 6 with additional stages that may be useful to configure the terminal to exchange and update data with a controller and to configure a visual interface on a display.

FIG. 8 illustrates a flow diagram for additional stages for method 400 that may be useful to properly adjust the process device, if necessary, to optimize performance with the second (or new) controller now found on the process device. The method 400 may include, at stage 434, determining whether the process device operated or moved from the locked condition. As noted herein, this stage may include stages for configuring a visual interface to solicit an input from the end user, although automatic configuration may be acceptable where the method 400 can communicate or "talk" with the second controller to identify the condition (locked condition or unlocked condition) that prevails on the process device. If this input is affirmative, then the method 400 may include, at stage 436, configuring the visual interface with instructions for performing one or more calibration routines. The method 400 may require this stage because the position reading for the closure member 122 may include significant error or deviations that are not accounted for during the maintenance task. In such case, proper calibration of the process device is in order to ensure it is operating accurately and within specified bounds.

The method 400 can avoid the calibration routine when the process device has remained it its locked condition. As shown in FIG. 8, if the process device has not moved (or remains in the locked condition), the method 400 may include, at stage 438, configuring the visual interface with instructions for adjusting the process device including, at stage 440, updating (one or more of) the upper stop limit and the lower stop limit for the valve 118. The method 400 may further include, at stage 442, configuring the visual display with instructions that the process device is ready for service and, at stage 444, configuring the visual interface to instruct the end user to change the device from its locked condition to an unlocked (or ready-to-operate) condition. The method 400 may further include, at stage 446, operating the process line with the process device having the second controller.

The method 400 may also be configured to allow the end user to refine or optimize performance of the process device. Such configurations can avoid the time intensive calibration and instead allow the end user to perform operations that can improve or "tweak" performance of the process device. In one implementation, the method 400 may include, at stage 448, determining whether the end user wishes to refine or evaluate operation of the process device with the second controller. This stage may solicit an input from the end user, for example, using a toggle or clickable icon that initiates the refining procedure. If the end user indicates a desire to refine the operation, then the method 400 can continue, at stage 450, configuring the visual interface with instructions to perform the refining procedure on the process device.

Figure 9:
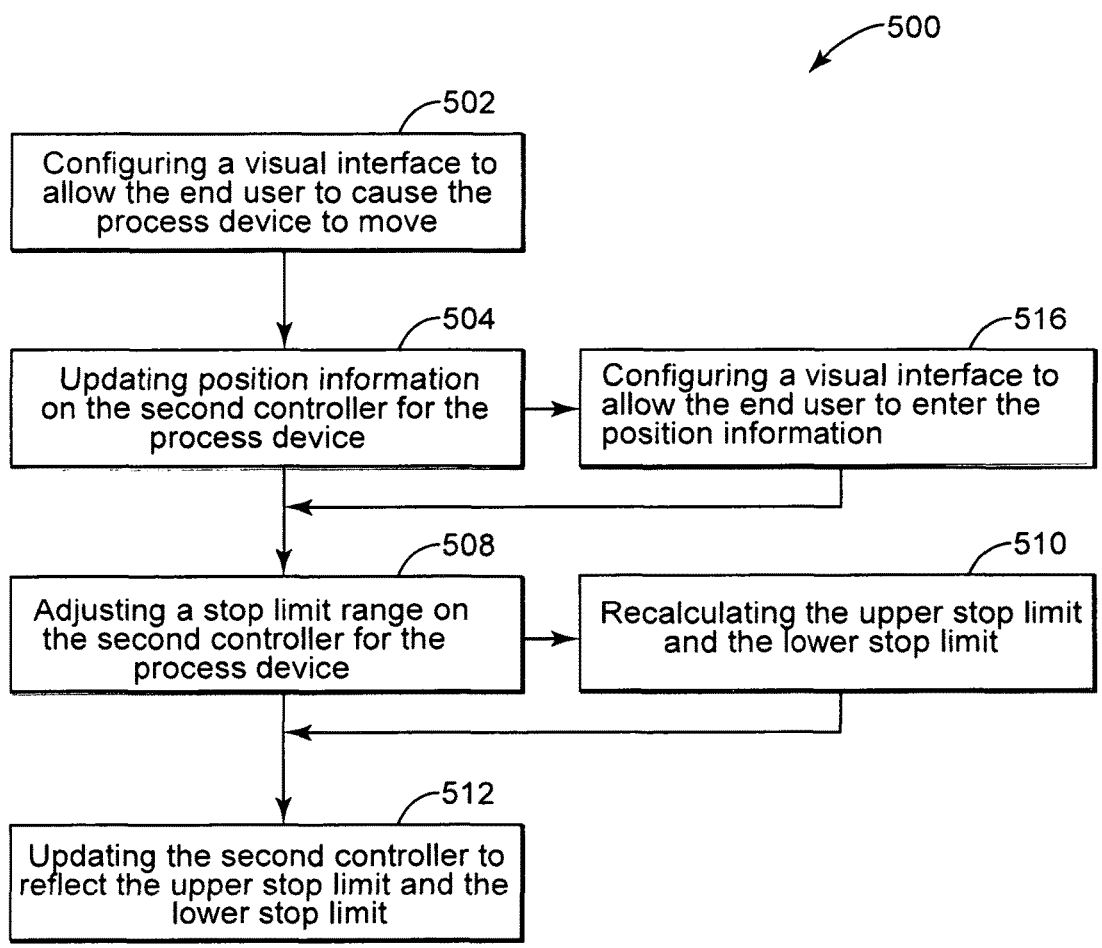
FIG. 9 depicts a flow diagram of an exemplary embodiment of a method for refining operation of a process device.

FIG. 9 illustrates a flow diagram for an exemplary embodiment of a method 500 for the refining procedure that can optimize performance of the process device. This refining procedure may be particularly useful for the valve assembly 102 and like flow controls. The method 500 may include, at stage 502, configuring the visual interface to allow the end user to cause the process device to move the valve. Such movement may change the location of the closure member 122 relative to the seat 124, often by a set amount (e.g., 10%). The method 500 may also include, at stage 504, updating position information for the valve and, in one example, at stage 506, configuring the visual interface to allow the end user to enter the position information. As noted above, the position information can include the location of the closure member 122 and the percentage (%) of opening for the valve 118. The method 500 may further include, at stage 508, adjusting a stop limit range for the valve, which may include, at stage 510, recalculating the upper stop limit and the lower stop limit (both noted above). The method 500 may also include, at stage 512, updating the controller (e.g., the second or new controller) to reflect the upper stop limit and the lower stop limit. The stages may further include, in whole or in part, actuating components on the valve assembly using the second controller; obtaining position information for the closure member from the second controller; and recalculating the upper stop limit and the lower stop limit using the position information.

Figure 10:
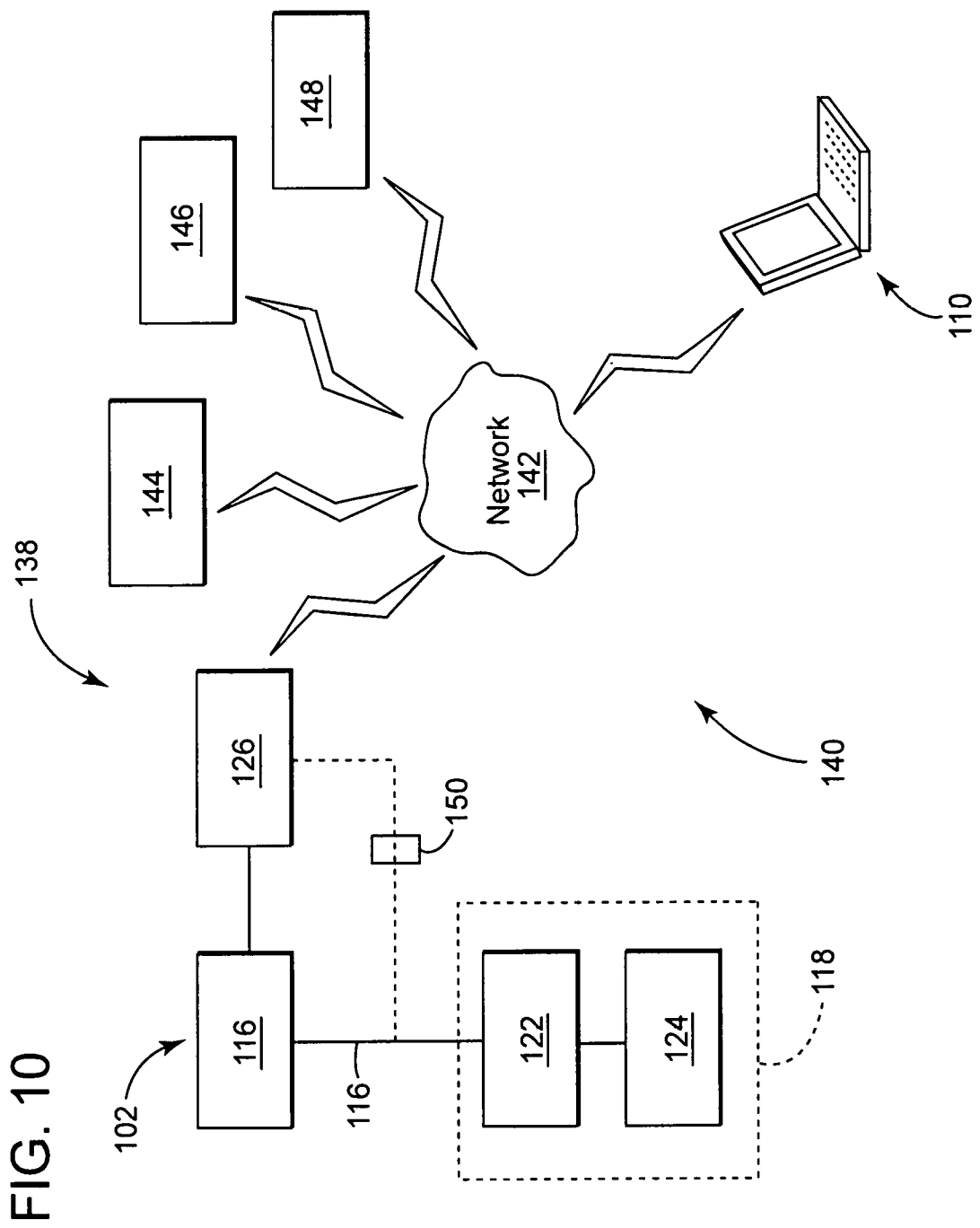
FIG. 10 depicts a schematic diagram of an example of a control system that can exchange signals with one or more controllers, e.g., the controller of FIGS. 1 and 2.

FIG. 10 depicts a schematic diagram of an example of the process device 102 in an exemplary application. This application incorporates the process device 102 as part of a control system 138. In this example, the control system 138 can include a network system 140 that includes a network 142. Examples of the network 142 can transfer data, information, and signals by way of wired protocols (e.g., 4-20 mA, FOUNDATION® Fieldbus, HART® etc.) and/or wireless protocols, many of which may find use in a plant or factory automation environment. These protocols may facilitate communication over the network 142 between the process device 102, the terminal 110, a process controller 144, a management server 146, and an external server 148. However, as noted above, cabled connections may be necessary to exchange data between, for example, the positioner 126 and the terminal 110. In one implementation, the process controller 144 can execute one or more computer programs to deliver a command signal to the positioner 126. The command signal may identify a commanded position for the closure member 122. The positioner 126 can use the commanded position to modulate the instrument gas to the actuator 116 and, effectively, allow the closure member 122 to move relative to the seat 124. As noted herein, the process device 102 may include a position sensor 150 to provide feedback to the positioner 126 that includes a position for the coupler 120. This position corresponds with the location and/or position of the closure member 122 relative to the seat 124.

Data may reside on a data source, often locally in one or more memories on the positioner 126, although this disclosure also contemplates configurations in which the data resides within one or more components of the system 140. For example, the data source may integrate with the management server 146 or as part of the external server 148. At the data source, the data may be arranged as one or more data sets that include one or more data samples. The data sets may be identified by an indicator (e.g., a date stamp, a time stamp, a date/time stamp, etc.) that relates to the chronological time at which the data samples in the data set were gathered and/or stored, e.g., in the repository or memory. For real-time use of the methods, the data samples may be read into a buffer and/or like configured storage medium that allows for ready access to the data samples to afford the methods with chronologically relevant data, taking into consideration necessary data processing time-lag. In one embodiment, the methods may include one or more stages for obtaining and/or retrieving the data from the data source.

Figure 11:
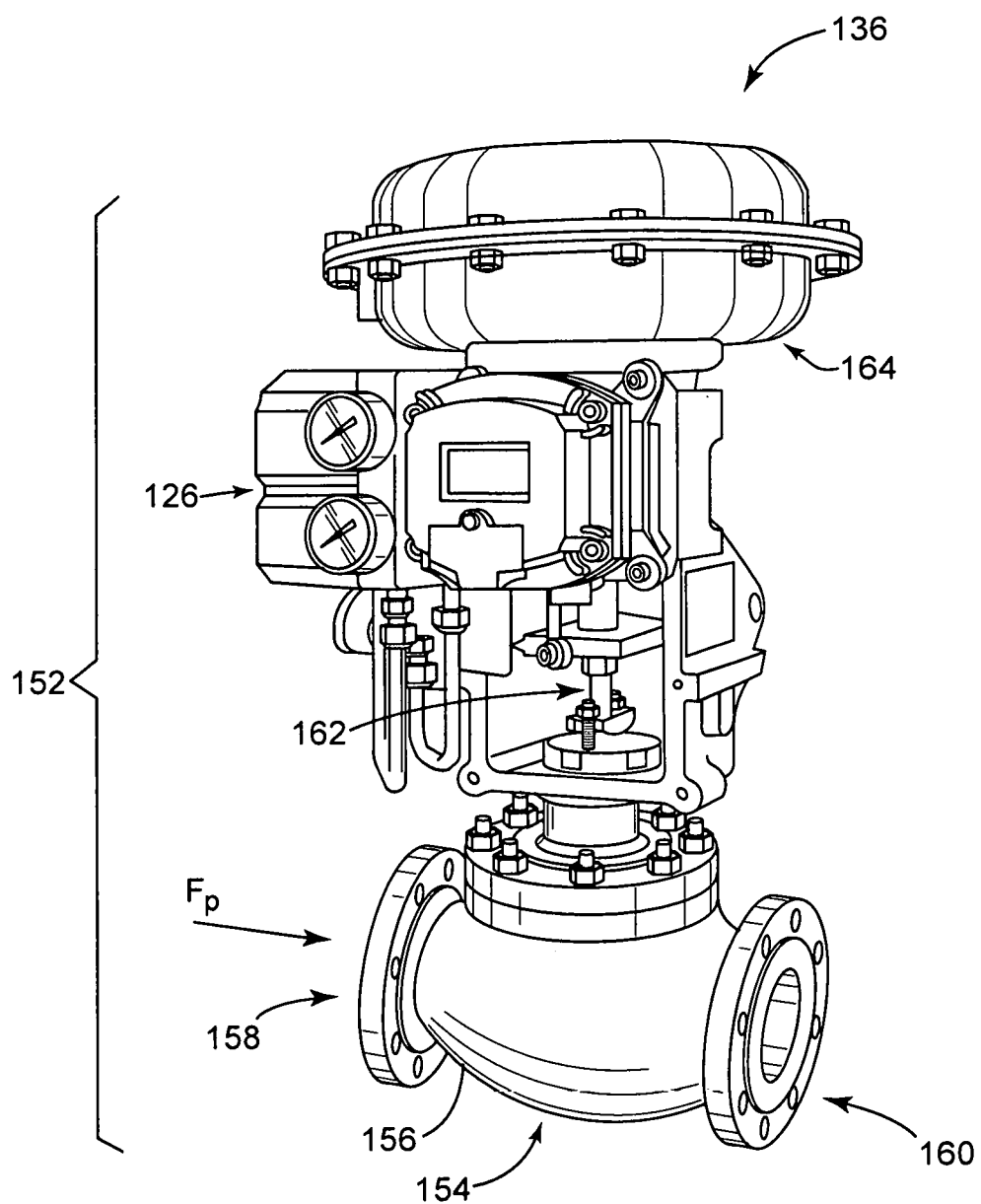
FIG. 11 depicts a perspective view of an example of the valve assembly of FIG. 1.

FIG. 11 depicts an exemplary structure 152 for the process device 102. This example embodies a valve assembly 136 (also, "control valve 136") that includes a fluid coupling 154 with a body 156, preferably cast from materials appropriate for use with the process fluids. The body 156 can have a first inlet/outlet 158 and a second inlet/outlet 160. The fluid coupling 154 can incorporate components of a valve (e.g., valve 118 of FIG. 2) inside of the interior to the body 156 and, thus, these components (e.g., closure member 122 and seat 124 of FIG. 2) are not shown in the present view. An elongate shaft 162 may be used as the coupler (e.g., coupler 120 of FIG. 2) to couple a pneumatic actuator 164 with the components of the valve. This structure can modulate a flow of process fluid $F_P$ between the inlet/outlets 158, 160.

One or more of the stages of the methods can be coded as one or more executable instructions (e.g., hardware, firmware, software, software programs, etc.). These executable instructions can be part of a computer-implemented method and/or program, which can be executed by a processor and/or processing device. The processor may be configured to execute these executable instructions, as well as to process inputs and to generate outputs, as set forth herein. For example, the software can run on the process device, the diagnostics server, and/or as software, application, or other aggregation of executable instructions on a separate computer, tablet, laptop, smart phone, wearable device, and like computing device. These devices can display the user interface (also, a "graphical user interface") that allows the end user to interact with the software to view and input information and data as contemplated herein.

The computing components (e.g., memory and processor) can embody hardware that incorporates with other hardware (e.g., circuitry) to form a unitary and/or monolithic unit devised to execute computer programs and/or executable instructions (e.g., in the form of firmware and software). As noted herein, exemplary circuits of this type include discrete elements such as resistors, transistors, diodes, switches, and capacitors. Examples of a processor include microprocessors and other logic devices such as field programmable gate arrays ("FPGAs") and application specific integrated circuits ("ASICs"). Memory includes volatile and non-volatile memory and can store executable instructions in the form of and/or including software (or firmware) instructions and configuration settings. Although all of the discrete elements, circuits, and devices function individually in a manner that is generally understood by those artisans that have ordinary skill in the electrical arts, it is their combination and integration into functional electrical groups and circuits that generally provide for the concepts that are disclosed and described herein.

Aspects of the present disclosure may be embodied as a system, method, or computer program product. The embodiments may take the form of an entirely hardware embodiment, an entirely software embodiment (including firmware, software, etc.) or an embodiment combining software and hardware aspects that may all generally be referred to herein as a "circuit," "module" or "system." The computer program product may embody one or more non-transitory computer readable medium(s) having computer readable program code embodied thereon.

Computer program code for carrying out operations for aspects of the disclosed subject matter may be written in any combination of one or more programming languages, including an object oriented programming language and conventional procedural programming languages. Program code embodied on a computer readable medium may be transmitted using any appropriate medium, including but not limited to wireless, wireline, optical fiber cable, RF, etc., or any suitable combination of the foregoing.

As used herein, an element or function recited in the singular and proceeded with the word "a" or "an" should be understood as not excluding plural said elements or functions, unless such exclusion is explicitly recited. Furthermore, references to "one embodiment" of the claimed invention should not be interpreted as excluding the existence of additional embodiments that also incorporate the recited features.

This written description uses examples to disclose the embodiments, including the best mode, and also to enable any person skilled in the art to practice the embodiments, including making and using any devices or systems and performing any incorporated methods. The patentable scope of the embodiments is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

In view of the foregoing discussion, the embodiments herein improve maintenance tasks necessary to service valve assemblies without the need to take disrupt operation of a process line. The embodiments can include one or more stages for configuring a valve positioner (or controller, generally) in a way that it can accept and overwrite data. A technical effect is to allow end users to swap the valve positioner from the valve assembly and, in turn, effectively create a "clone" as between a first valve positioner that was previously-installed on the valve assembly and a second valve assembly that is installed in place of the first valve positioner. These embodiments may embody hardware including configurations of a valve assembly and valve positioner. The embodiments can also embody methods to configure this hardware to perform certain functions or functionality. In this regard, the examples below include certain elements or clauses one or more of which may be combined with other elements and clauses describe embodiments contemplated within the scope and spirit of this disclosure.

What is claimed is:

1. An apparatus, comprising:
   a processor with access to executable instructions for,
      identifying a change in a valve assembly to a locked position that prevents movement of a closure member relative to a seat;
      receiving a first set of data from a first controller on the valve assembly, the data comprising information that defines values for operating parameters on the first controller;
      instructing an end user to remove the first controller from the valve assembly;
      identifying a change from the first controller with a second controller on the valve assembly;
      generating a second set of data for use with the second controller on the valve assembly, the data comprising information that defines the values for operating parameters corresponding with the first controller; and
      adjusting an upper stop limit and a lower stop limit on the second controller by,
         actuating components on the valve assembly using the second controller;
         obtaining position information for the closure member from the second controller; and
         recalculating the upper stop limit and the lower stop limit using the position information.

2. The apparatus of claim 1, wherein the executable instructions are also for, transmitting the second set of data to the second controller.

3. The apparatus of claim 1, wherein the executable instructions are also for,
   instructing the end user to change the valve assembly from the lock position to an unlocked position.

4. The apparatus of claim 1, wherein the executable instructions are also for,
   changing the valve assembly from the locked position to an unlocked position.

5. The apparatus of claim 1, wherein the executable instructions are also for,
   instructing the end user to move the closure member relative to the seat.

6. The apparatus of claim 1, wherein the executable instructions are also for,
   moving the closure member relative to the seat.

7. The apparatus of claim 1, wherein the executable instructions are also for,
   instructing the end user to indicate that the second controller is in position on the valve assembly.

8. The apparatus of claim 1, wherein the executable instructions are also for,
   receiving confirmation that the second controller is in position on the valve assembly.

9. The apparatus of claim 1, wherein the executable instructions are also for,
   confirming that the second controller is in position on the valve assembly.

10. The apparatus of claim 1, wherein the executable instructions are also for,
    receiving confirmation from the end user that the values in the first set of data are correct.

11. The apparatus of claim 1, wherein the executable instructions are also for,
    confirming identifying information on the second controller corresponds with identifying information from the first controller.

12. The apparatus of claim 1, wherein the executable instructions are also for,
    receiving identifying information from the second controller; and
    instructing an end user to confirm that the identifying information corresponds with identifying information from the first controller.

13. The apparatus of claim 1, wherein the executable instructions are also for,
    confirming firmware on the second controller corresponds with firmware on the first controller.

14. The apparatus of claim 1, wherein the executable instructions are also for,
    causing the first controller to transmit the first set of data.

15. A system, comprising:
    a valve assembly comprising an actuator, a valve coupled to the actuator, the valve comprising a closure member movable relative to a seat, and a valve positioner coupled to the actuator; and
    a computing device connectable to the valve positioner, the computing device comprising a processor with access to executable instructions for, identifying a change in the valve assembly to a locked position that prevents movement of the closure member relative to the seat;

receiving a first set of data from a first controller on the valve assembly, the data comprising information that defines values for operating parameters on the first controller;

instructing an end user to remove the first controller from the valve assembly;

identifying a change from the first controller with a second controller on the valve assembly;

generating a second set of data for use with the second controller on the valve assembly, the data comprising information that defines the values for operating parameters corresponding with the first controller; and adjusting an upper stop limit and a lower stop limit on the second controller by,
    actuating components on the valve assembly using the second controller;
    obtaining position information for the closure member from the second controller; and
    recalculating the upper stop limit and the lower stop limit using the position information.

\* \* \* \* \*